US006985975B1

(12) United States Patent
Chamdani et al.

(10) Patent No.: US 6,985,975 B1
(45) Date of Patent: Jan. 10, 2006

(54) PACKET LOCKSTEP SYSTEM AND METHOD

(75) Inventors: Joseph I. Chamdani, Santa Clara, CA (US); Michael Corwin, Sunnyvale, CA (US)

(73) Assignee: Sanera Systems, Inc., Sunnyvale, CA (US)

( * ) Notice: Subject to any disclaimer, the term of this patent is extended or adjusted under 35 U.S.C. 154(b) by 902 days.

(21) Appl. No.: 09/895,288

(22) Filed: Jun. 29, 2001

(51) Int. Cl.
*G06F 3/00* (2006.01)

(52) U.S. Cl. .................. 710/55; 53/54; 53/56; 714/44; 714/47; 714/48

(58) Field of Classification Search .................. 710/52, 710/53, 54, 55, 56, 57; 714/44, 47, 48
See application file for complete search history.

(56) References Cited

U.S. PATENT DOCUMENTS

| | | | | |
|---|---|---|---|---|
| 4,507,782 A * | 3/1985 | Kunimasa et al. | .......... | 714/748 |
| 5,226,152 A | 7/1993 | Klug et al. | | |
| 5,675,579 A * | 10/1997 | Watson et al. | .............. | 370/248 |
| 6,148,348 A * | 11/2000 | Garnett et al. | ................ | 710/14 |
| 6,601,210 B1 * | 7/2003 | Kagan | ........................ | 714/758 |

OTHER PUBLICATIONS

Derfler and Freed; How Networks Work; 2000; Que; Millennium Edition, p. 166.*
U.S. Appl. No. 09/944,425, Joseph Chamdani et al.
U.S. Appl. No. 09/943,842, Joseph Chamdani et al.
U.S. Appl. No. 09/943,660, Joseph Chamdani et al.
U.S. Appl. No. 09/892,216, Joseph Chamdani et al.
Vijayan, Jaikumar, "Fault-Tolerant Computing," Computerworld (Nov. 20, 2000) <http://www.computerworld.com/cwi/story/0, 1199,NAV47-72_STO54160,00.html>.
Sun Microsystems, Inc., Netra FT 1800 White Paper, chapter 2 (1999).
Spainhower, L. et al., "IBM S/390 Parallel Enterprise Server G5 fault tolerance: A historical perspective," IBM Journal of Research & Development, May 27, 1999.
Check, M.A. et al., "Custom S/390 G5 and G6 microprocessors," IBM Journal of Research & Development, May 28, 1999.
Mueller, M. et al., "RAS Strategy for IBM S/390 G5 and G6," IBM Journal of Research & Development, May 20, 1999.
Sun Microsystems, Inc., Netra FT 1800 White Paper (1999).
Dunstan, Adam et al., Reliable Backbone Bandwidth Using Composite Links White Paper (visited Devember 14, 2001) <http://www.avici.com/technology/whitepapers/reliable_backbone.pdf>.
Avici Systems, Inc., The Use of Composite Links to Facilitate the Creation of a New Optical Adaptation Layer White Paper (visited Dec. 14, 2001) <http://www.avici.com/technology/whitepapers/Composite_links.pdf>.

* cited by examiner

*Primary Examiner*—Tammara Peyton
*Assistant Examiner*—Alan Chen
(74) *Attorney, Agent, or Firm*—Baker Botts L.L.P.

(57) ABSTRACT

A device for ensuring reliable data packet throughput in a redundant system includes a splitter that creates copies of a data packet and sends each copy to a separate intermediate source for processing, parallel buffers for receiving the processed packets from the intermediate sources, and a comparator for determining whether the data packets are equivalent.

16 Claims, 5 Drawing Sheets

PACKET LOCKSTEP SYSTEM AND METHOD

BACKGROUND

1. Field of the Invention

The present invention relates generally to data transmission, and more particularly to a packet lockstep mechanism for ensuring reliable data packet throughput in a redundant system.

2. Description of the Prior Art

With early networked storage systems, files are made available to the network by attaching storage devices to a server, which is sometimes referred to as Direct Attached Storage (DAS). In such a configuration, the server controls and "owns" all of the data on its attached storage devices. A shortcoming of a DAS system is that when the server is off-line or not functioning properly, its storage capability and its associated files are unavailable.

At least the aforementioned shortcoming in DAS systems led to Network Attached Storage (NAS) technology and associated systems, in which the storage devices and their associated NAS server are configured on the "front-end" network between an end user and the DAS servers. Thus, the storage availability is independent of a particular DAS server availability and the storage is available whenever the network is on-line and functioning properly. A NAS system typically shares the Local Area Network (LAN) bandwidth, therefore a disadvantage of a NAS system is the increased network traffic and potential bottlenecks surrounding the NAS server and storage devices.

At least the aforementioned shortcoming in NAS systems led to Storage Area Networking (SAN) technology and associated systems. In SAN systems, storage devices are typically connected to the DAS servers through a separate "back-end" network switch fabric (i.e., the combination of switching hardware and software that control the switching paths).

FIG. 1 shows a block diagram of a Storage Area Network 10 of the prior art connected to a client 11 through a wide area network (WAN) such as the Internet 12, or a local area network (LAN) such as might be implemented within an enterprise. The SAN 10 includes an IP router 14, an IP switch 16, a plurality of servers 18, 20, 22, and different storage media represented as Redundant Arrays of Inexpensive Disks (RAID) 26, Just a Bunch of Disks (JBOD) 28, 30, and tape back-up 32, connected to the separate "back-end" network switch fabric 34 described above.

The deployment of prior SAN technologies in the growing enterprise-class computing and storage environment has created several challenges. One such challenge is to provide a scalable system in which thousands of storage devices can be interconnected. One solution has been to cascade together a multitude (tens to hundreds) of small SAN switches, however, a packet switched through such a system typically must make numerous hops before reaching a destination port. Performance (e.g., latency and bandwidth) and reliability decline in such systems. Additionally, systems including hundreds of interconnected switches are inherently difficult to manage and to diagnose for faults, both from hardware and software perspectives. Further still, since no SAN protocol is truly ubiquitous enough to be readily integrated with other networking architectures in a heterogeneous SAN environment, bridges and conversion equipment are required, increasing the costs to build and maintain such a system.

Another such challenge is to provide a system that is fault tolerant. A fault tolerant system is one that is capable of continuous service despite a component fault or failure, and additionally capable of continuous service through any subsequent repair. To this end, a hardware fault is typically detected and circumvented by switching to a redundant component.

A common redundancy scheme in SAN networking is to use two physical connections or ports with different addresses to feed two separate logical paths. In such a system, either of the redundant components may be active at a time, or a load sharing and balancing technique may be implemented. A popular method for monitoring redundant components is a "heartbeat" scheme in which a first processor, card, or other component systematically communicates with a second redundant processor, card, or component in order to verify the second component's operational state, or heartbeat. Lack of a reply from the second component is taken as an indication that the second component is faulty.

Some fault tolerant systems operate the redundant components in lockstep, meaning that the redundant components concurrently perform identical operations. Thus, in the event of a component failure, an application can continue to execute by using the output from the corresponding redundant component, and the failure will therefore be transparent to an end user. Lockstepping can therefore provide zero loss of data integrity upon a single component fault or failure.

In addition to lockstepping at the component level, lockstepping is sometimes also utilized at the processor level and at the circuit board level to provide a level of fault tolerance to entire system architectures. One lockstepping method for attaining fault tolerance at the processor level includes employing a fault tolerant core that is absolutely trusted. The core is commonly a third processor used to verify the integrity of duplicate systems by checking for errors. Each of the processing sets included in such a core typically are configured with a processor module, caches, RAM for that processing set, and PCI buses.

The processing sets are driven by synchronized clocks to execute both sets in lockstep. Since the clocks are locked, each transistor in a correctly functioning processor set will perform the same transaction as its sibling transistor on the sibling processor set, on a nanosecond by nanosecond basis. A transaction is taken from each processing set by a PCI bridge and the two transactions are compared. As described above with respect to lockstepped components, processors operating in lockstep have their transactions compared at each and every clock cycle. If the transactions are identical when compared, the transaction is passed to the physical PCI bus. However, if the transactions are not identical an exception handler typically identifies the faulty processing set.

Other lockstepping schemes compare processor transactions less frequently than at each clock cycle, for example, at the memory transaction level, at the bus level, and/or at the input/output level. Such schemes can be unpredictable as a result of component or card unpredictability. For example, small variations in the temperatures of identical components in identical processors running in parallel can trigger processor interrupts differently, causing the parallel processors to fall out of lockstep.

A functional lockstep arrangement for redundant processors, described in U.S. Pat. No. 5,226,152 to Klug et al., compares processor transactions at each write operation. Klug et al. teach that asynchronous inputs to redundant processors will generally fail in a clock lockstep mode. According to Klug et al., an asynchronous input signal can change during a sampling time, and there is a certain probability that the change will only be seen by one of the two processors, thus a comparison between the two processors would show a discrepancy, or failure, even though both processors were functioning properly.

Klug et al. further teach that when an input signal properly causes a processor interrupt to occur, it is possible for one processor to respond to the interrupt and begin execution of an interrupt service routine even though a parallel processor will not see the same signal until the next clock cycle. Hence, the two processors will fall out of clock lockstep, again, in the absence of a hardware fault.

In view of the preceding scenarios, it will be appreciated that the processor lockstepping schemes can fall out of lockstep even though all of the hardware is functioning correctly. Circuit board lockstepping schemes are similarly problematic. For example, unpredictable minute variations between circuit boards operating in parallel make it difficult to maintain a lockstep relationship between them.

In light of the aforementioned challenges with respect to implementing fault tolerant systems, a lockstep circuit for packet processing is required that will provide error checking and redundancy without generating faults in response to asynchronous data.

SUMMARY

A packet lockstep mechanism, a lockstep device, and an associated method of use are described. A high level implementation is described in which the lockstep mechanism and device are used within the context of a unified network system comprising one or more line cards to provide packet conversion and processing capabilities in communication with one or more switch cards to provide flow control and switching capabilities.

The mechanism of the present invention is for a first data packet received and processed in a first source and a second data packet received and processed in a second source where the second data packet is equivalent to the first data packet. The mechanism includes a first buffer configured to receive the first data packet from the first source and the second buffer configured to receive the second data packet from the second source. Preferably, each buffer is a first-in first-out memory and the first and second sources are line cards. The mechanism also includes a comparator configured to receive the first and second packets and to output one of the packets upon a determination of equivalence between them.

In some embodiments of the mechanism the comparator makes the determination of equivalence by comparing a first signature derived from the first data packet with a second signature derived from the second data packet. In some of these embodiments the signature is a checksum. The mechanism can also include a copier configured to receive a third data packet and to output identical copies thereof to each of the first and second buffers.

The lockstep device of the present invention includes a coupler configured to receive an original data packet and to output a first data packet that is an identical copy of the original data packet and a second data packet that is an identical copy of the original data packet. The device also includes a first intermediate source configured to receive the first data packet from the coupler and a second intermediate source configured to receive the second data packet from the coupler. Further, the device includes a lockstep mechanism of the present invention in communication with the first and second intermediate sources. In some embodiments the device further includes a copier configured to receive a second original data packet and to output to one of the first and second buffers the second original data packet, and to output to the other of the first and second buffers a third data packet that is a copy of the second original data packet. In some of these embodiments the first and second intermediate sources are further configured to transmit the third and fourth data packets to the coupler.

A lockstep system of the present invention comprises a lockstep device of the present invention coupled to a crossbar circuit. The system also includes a copier configured to receive the data packet output from the comparator and to output as a third data packet the data packet output from the comparator and to output as a fourth data packet a copy of the data packet output from the comparator. The system additionally includes a third buffer configured to receive the third data packet from the copier and a fourth buffer configured to receive the fourth data packet from the copier. The crossbar circuit of the system is configured to receive the data packet output from the comparator and is capable of routing the data packet to the copier. In some embodiments the system includes a third intermediate source configured to receive the third data packet from the third buffer, and a fourth intermediate source configured to receive the fourth data packet from the fourth buffer.

A packet-switching unified network system of the present invention comprises a first main line card including a port capable of receiving a first packet, a first spare line card including a port capable of receiving a second packet, and a switch card in communication with the main and spare line cards across a backplane. The switch card in these systems includes a flow control circuit having a lockstep mechanism of the present invention.

In some embodiments of the unified network system the switch card further includes a crossbar circuit in communication with a comparator of the lockstep mechanism, and the flow control circuit further has a copier in communication with the crossbar circuit and configured to receive a data packet output from the comparator. In these embodiments the copier is also configured to output a third data packet that is an identical copy of the data packet output from the comparator and a fourth data packet that is an identical copy of the data packet output from the comparator. In these embodiments the switch card also includes a third buffer configured to receive the third data packet from the copier; and a fourth buffer configured to receive the fourth data packet from the copier. Embodiments of this system can also include a second main line card in communication with a third buffer and including at least one port capable of transmitting a third packet, and a second spare line card in communication with a fourth buffer and including at least one port capable of transmitting a fourth packet.

A method for lockstep data packet processing according to the present invention includes processing a first data packet in a first source, outputting a processed first data packet from the first source, processing a second data packet in a second source, the second data packet being equivalent to the first data packet, outputting a processed second data packet from the second source, receiving the first processed data packet in a first buffer, receiving the second processed data packet in a second buffer, determining whether the first and second processed data packets are equivalent, and passing one of the first and second processed data packets if the first and second processed data packets are determined to be equivalent. In some embodiments the method includes deriving the first and second data packets from an original data packet. The method of the present invention can further include synchronizing the first and second data packets before comparing them. In some embodiments determining whether the first and second processed packets are equivalent is performed by comparing a first signature derived from the first data packet and a second signature derived from the second data packet. In further embodiments the first and second signatures are checksums.

In additional embodiments of the method, if the first and second processed data packets are determined to be not equivalent, the first and second processed data packets are discarded. In some of these embodiments a fault isolation mode is also initiated. The fault isolation mode can include error logging and a system alarm.

Another method of the present invention includes receiving a first data packet at a coupler, creating within the coupler a second data packet that is a copy of the first data packet, passing the first data packet to a first line card and passing the second data packet to a second line card, performing packet processing on the first data packet in the first line card to generate a first processed data packet and performing packet processing on the second data packet in the second line card to generate a second processed data packet. The method additionally includes receiving the first processed data packet in a first buffer of a flow control circuit on a switch card and receiving the second processed data packet in a second buffer of the flow control circuit on the switch card, determining whether the first and second processed data packets are equivalent, and passing one of the first and second processed data packets to a crossbar circuit if the first and second processed data packets are determined to be equivalent. In these embodiments the packet processing can include physical layer processing and protocol conversion processing. The protocol conversion processing can further include encapsulation and direct translation.

Implementations of the present invention can be beneficial to any packet-switched system or network that is intended to provide a fault tolerant RAS (Reliability, Availability, Serviceability) architecture and strategy, in addition to the unified network system described herein, and can enhance reliable data packet throughput. The present invention is configurable, for example, in a redundant system that is intended to avoid single-point failures at any system component. Lockstepping at the data packet level is less dependent on the system transaction order on common buses or memory, which are typically difficult to control given the unpredictability inherent to circuit cards/components. Packet lockstepping offers a method for analyzing data throughput on a flow-by-flow basis instead of depending on card/component transaction level events.

The present invention is also beneficial in that the intermediate sources perform less overhead processing related to fault tolerance compared with components that use the aforementioned "heartbeat" scheme because the intermediate sources are not required to send, receive, and manage the "heartbeat" messages. Additionally, a separate component performs the data integrity verification function in lieu of the intermediate sources, further reducing the overhead processing. Further still, the present invention does not require complete and independent redundant system data paths, but can be implemented in various different locations within a system, and can be used to monitor various components operating in lockstep.

BRIEF DESCRIPTION OF DRAWINGS

The present invention is illustrated by way of example, and not by way of limitation, in the figures of the accompanying drawings in which like reference numerals refer to similar elements and in which.

DETAILED DESCRIPTION OF THE INVENTION

In the following description, for the purposes of explanation, numerous specific details are set forth in order to provide a thorough understanding of the present invention and implementation thereof. It will be apparent, however, to one skilled in the art that the present invention may be practiced without these specific details. In other instances, well-known structures and devices are shown in block diagram form in order to avoid unnecessarily obscuring the present invention.

Figure 2:
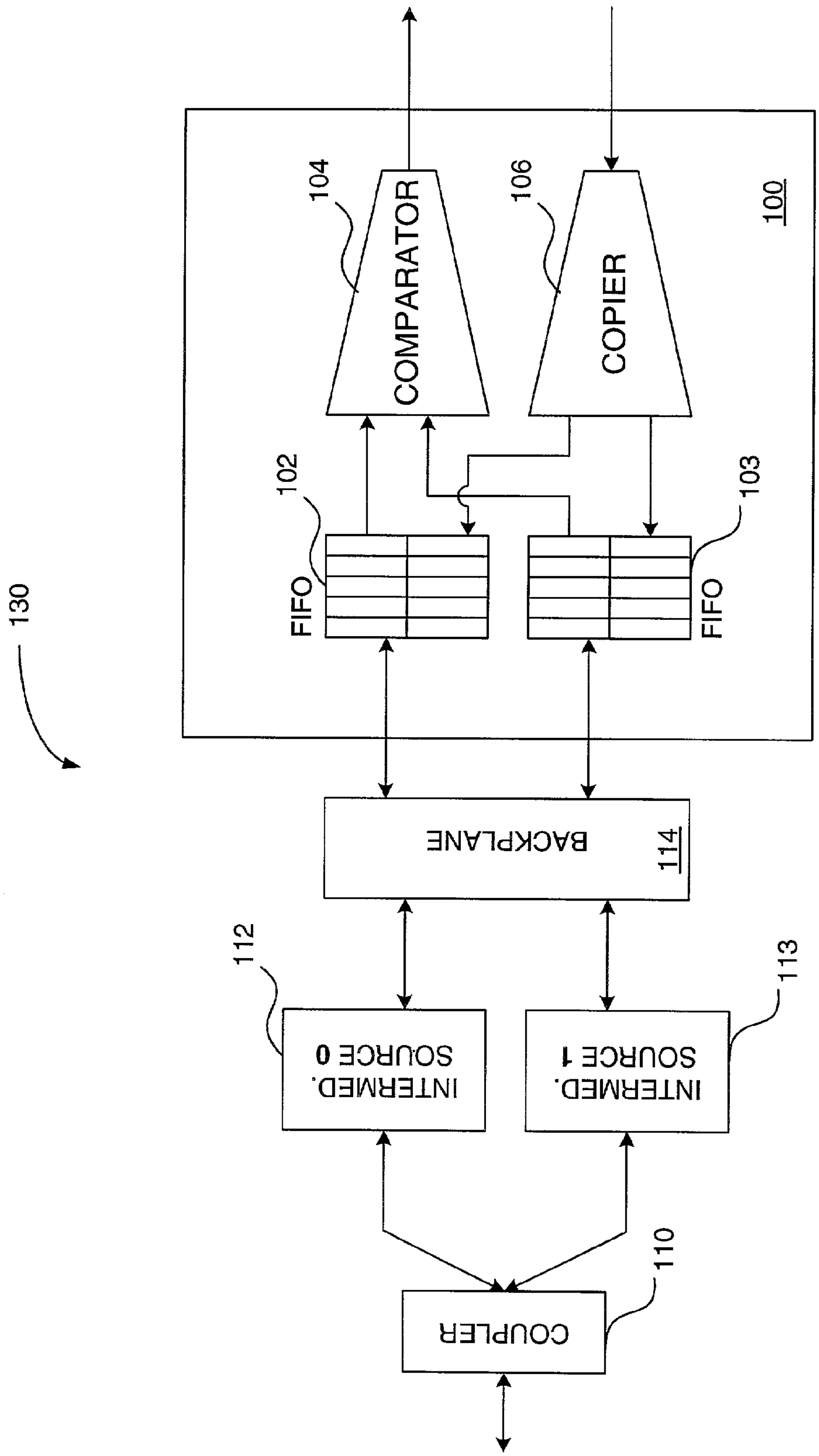
FIG. 2 is a block diagram of a packet lockstep mechanism in conjunction with associated input components, in accordance with an embodiment of the present invention.

FIG. 2 is a block diagram of an exemplary packet lockstep mechanism 100 in conjunction with associated input components, in accordance with an embodiment of the present invention. For illustrative purposes, the present invention will be described herein as it operates in an exemplary storage area network (SAN) environment. The exemplary SAN may utilize currently known network storage/transport technologies and protocols such as Fibre Channel (FC) (specified in a family of American National Standards Institute [ANSI] standards) or InfiniBand™ (IB), or it may utilize network storage/transport technologies and protocols not yet known in the art. The practice of the invention is not limited to a SAN environment nor to any particular storage/transport technology or protocol, and those skilled in the art will recognize other applications and other operating environments in which the invention may be practiced.

Figure 1:
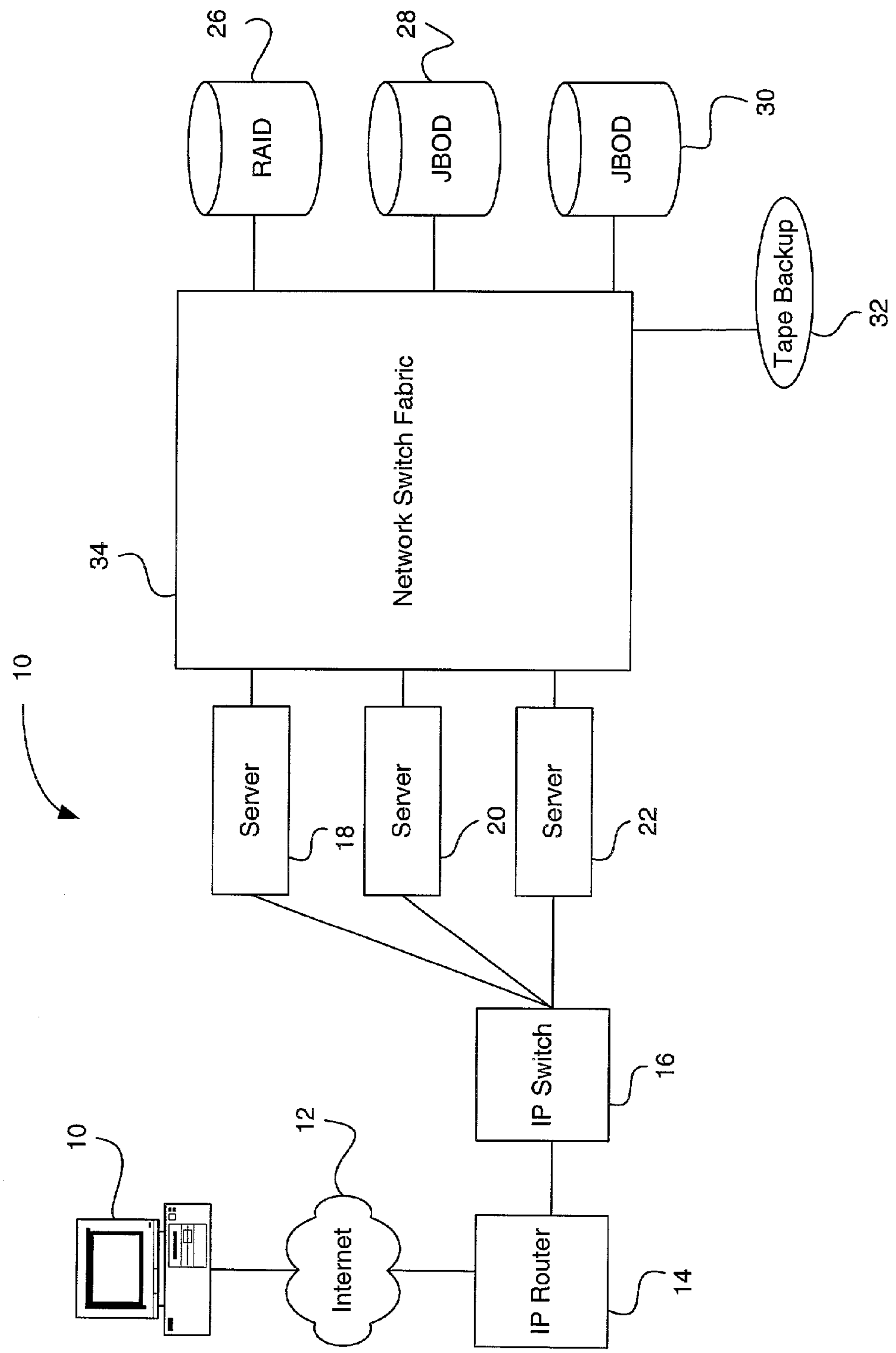
FIG. 1 is a block diagram of a Storage Area Network of the prior art.

FIG. 2 shows a lockstep comparison device 130 comprising a coupler 110, first and second intermediate sources 112 and 113, a backplane 114, and a lockstep mechanism 100. The lockstep device 130 is connected between a source (not shown) and a destination (not shown) preferably in a single node. As in FIG. 1, sources and destinations are typically components of a SAN 10 such as server 18 and storage media 26, 28, 30, and 32 in the preferred embodiment of the present invention. The lockstep device 130 receives and acts upon the data packets (hereinafter referred to simply as packets) as they move from source to destination.

Referring back to FIG. 2, lockstep device 130 is connected to a source by coupler 110, which is preferably a fiber coupler. The coupler 110 is further connected to first and second intermediate sources 112 and 113. The coupler 110 is configured to receive an original packet from the source and to output two packets that are identical to the original packet, and which will be referred to as first and second packets. First and second packets are outputted to first intermediate source 112 and second intermediate source 113, respectively. It will be appreciated that the two packets that are identical to the original packet may both be copies made from the original packet, or one may be a copy of the original while the other is the original packet itself. For the purposes of this disclosure a copy of a data packet can be either a replication of the packet or the packet itself.

As will be described in greater detail below, intermediate sources 112 and 113 may be line cards configured as part of a rack system (not shown). Intermediate sources 112 and 113 may process the first and second packets which can include segmenting each packet into one or more cells containing header and payload information. Henceforth, it will be understood that packet can refer to an entire data packet either segmented or unsegmented, or a set of one or more cells derived from a packet. The intermediate sources 112 and 113 are preferably connected to a backplane 114, which is an electronic bus for connecting together multiple electronic devices, circuit boards, or cards. In the present context, backplane 114 connects the intermediate sources 112 and 113 with lockstep mechanism 100.

With continued reference to FIG. 2, lockstep mechanism 100 comprises first-in first-out (FIFO) memories FIFO 102 and FIFO 103 each connected to a comparator 104, and each optionally connected to a copier 106. FIFO 102 and FIFO 103 are buffers for receiving the cells of first and second packets, respectively, from intermediate sources 112 and 113. Each FIFO 102 and 103 includes one or more queues for storing data in the order of receipt so that the data may be output in the same order. FIFOs 102 and 103 are synchronized when each is configured to next output the same cell or cells from the same packet, for example, when both FIFOs 102 and 103 are configured to output the third cell derived from the same original packet. It will be appreciated that in some networks, such as Asynchronous Transfer Mode (ATM) networks in which related cells are processed asynchronously relative to one another, equivalent cells or packets often arrive at a common location at different times or in different clock cycles. Accordingly, buffering the cells of the first and second packets in FIFOs 102 and 103 allows all of the cells of each packet to assemble prior to being compared by comparator 104.

Buffering at FIFOs 102 and 103 preferably occurs under the control of a control logic (not shown) in conjunction with a clock (not shown). The control logic controls when the contents of FIFOs 102 and 103 are compared and will not allow cells to be outputted to a destination until the packets within FIFOs 102 and 103 have been determined to be equivalent, i.e., all of the cells of the packet are present and represent originally identical information from the source.

The comparator 104 is configured to receive two sets of cells from intermediate sources 112 and 113 and to output a single set of cells from the lockstep mechanism 100. Comparator 104 compares the cells of the first and second packets and determines whether they are equal, or equivalent. There are a number of known methods for comparing and determining whether a plurality of data flows are equivalent, described below.

One method for determining the equivalency of two sets of cells is to make an exact bit level comparison of either or both cell header and payload. The cell headers can be compared to find unreliable cells that happen to have the same payload. In this bit level method, one or more bits may be intentionally masked depending on the format and/or information in the cell header. For example, if the cell header contains a source port number, the associated bit position that differs between comparable data flows will resultantly be masked out.

A preferred method for determining the equivalency of two sets of cells that is both simpler and more practical than the bit level comparison employs comparing cell signatures. In one embodiment of the present invention the comparator 104 compares checksums for the two sets of cells. A checksum is a numerical value based on the number of set bits in a cell. Any difference in the received numerical values for the two sets of cells indicates that the copies are no longer the same.

A checksum can be determined for a packet, for example, once all of the cells of the packet have assembled in a FIFO 102 or 103. In some embodiments the checksum is calculated by the comparator 104 after a packet has been sent from a FIFO 102, 103. In other embodiments control logic determines the checksum for a packet while still in FIFO 102, 103 and stores the value along with the packet. In some of these embodiments packets and associated checksums are output together from each FIFO 102, 103 to the comparator 104. If the checksums are the same then the comparator outputs either of the two packets. In other embodiments a packet and associated checksum are output to the comparator 104 from one FIFO 102 or 103, while the other FIFO 103 or 102 outputs only the checksum to the comparator 104. In these embodiments, if the checksums are the same, the one packet received by the comparator 104 is output. In still other embodiments only the checksums are sent from the FIFOs 102 and 103, and if the checksums are equal, control logic releases one of the packets from one of the FIFOs 102, 103 to pass through the comparator 104 or to be routed around the comparator 104 and out of the mechanism 100. Sending only one packet, or neither of the packets, to the comparator 104 reduces the total amount of data that must be transferred within the mechanism 100 for each flow that is compared.

As with the specific case of a checksum, a signature generally can be generated and stored as cells from intermediate sources 112 and 113 arrive at or leave FIFOs 102 and 103. Alternately, a signature can be generated within the comparator 104. Various schemes for generating signatures are known in the art. One such scheme is based on a polynomial using XOR gates and flip-flops.

Note that cell signature comparisons are preferably executed on a flow basis, where a flow is a stream of cells coming from a unique input port and travelling to a unique output port. Executing cell signature comparisons on a flow basis is preferable because cell ordering is guaranteed within flows in preferred embodiments. Also note that in some embodiments the comparator 104 can be connected to more than one set of FIFOs in order to receive cells from multiple flows coming from different input ports but going to the same output port.

Absent a fault of some kind, the comparator 104 will determine that the cells from both FIFOs 102 and 103 are equivalent. Thereafter, the cells from one FIFO 102 or 103 is output from the comparator 104 while the cells from the other FIFO 103 or 102 are discarded. In the event that a difference is determined between the cells from the two FIFOs 102 and 103, the comparator 104 preferably is configured to discard both sets of cells. It will be understood that while it is preferred to discard all cells upon the determination of a difference, in other embodiments the comparator 104 can be configured to output either of the first or second packets if one is determined to be still equivalent to the original packet. In still other embodiments the comparator 104 can be configured to output the first or second packet that varies least from the original packet where neither the first or second packet is equivalent to the original packet.

Figure 4:
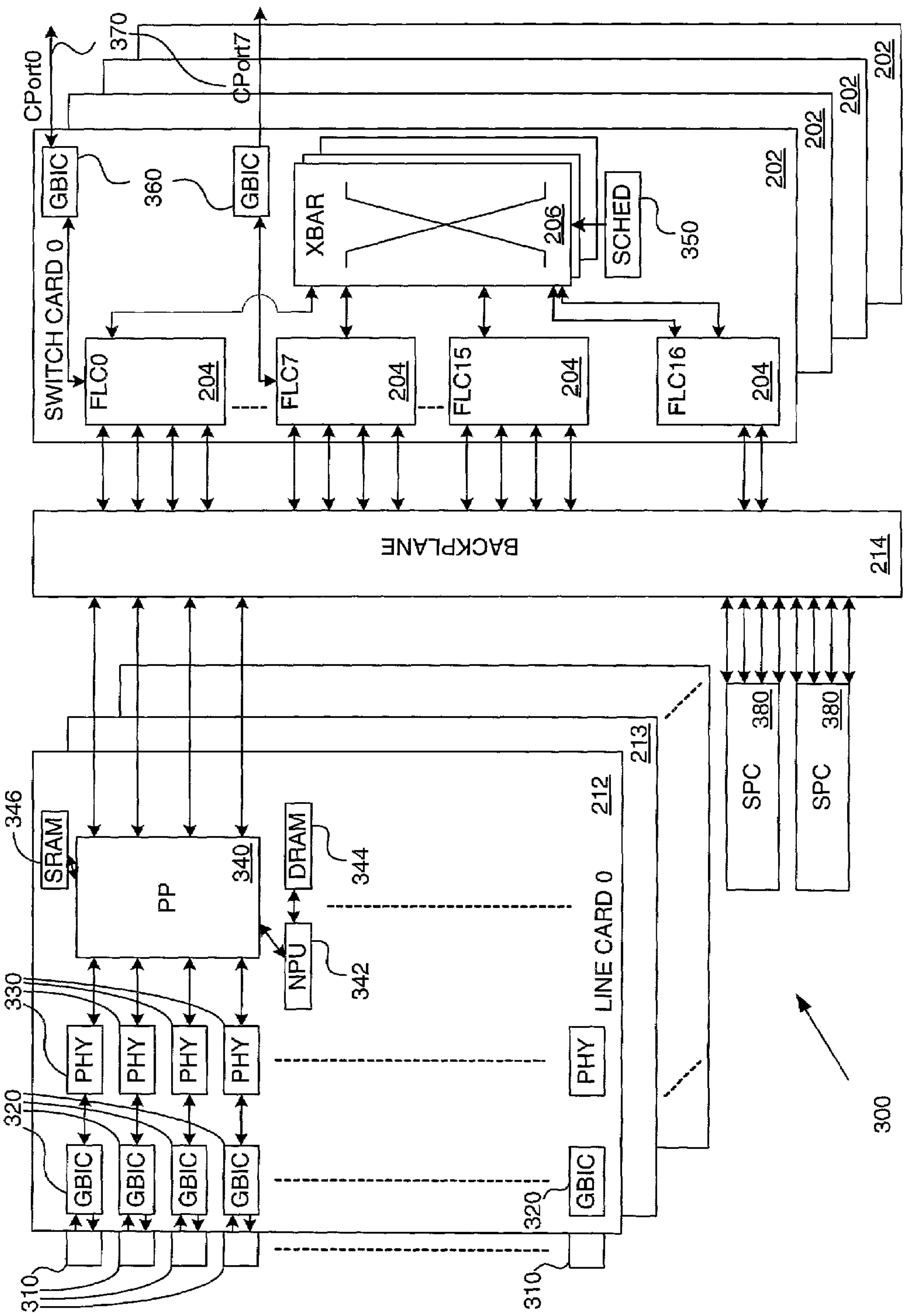
FIG. 4 is a block diagram of an exemplary packet-switched unified network system in which an embodiment of the present invention can be implemented.

Additionally, should the comparator 104 determine that cells received from the two FIFOs 102 and 103 are different, a fault isolation mode can be initiated, preferably under the control of separate control logic (e.g., see service processor card 380 of FIG. 4). The fault isolation mode can include error logging. In a preferred embodiment, a system alarm also notifies a network administrator upon an inequality determination. Fault isolation methods are well known in the art. Some fault isolation methods examine error heuristics related to the intermediate sources 112 and 113 and initiate component self-diagnostic routines, preferably utilizing built-in-self-test (BIST) embedded logic or software. If fault isolation methods fail to identify the source of an error, the error is determined to be intermittent. In such case the fault mode is ended and lockstep comparisons are resumed.

If, on the other hand, the fault mode identifies an intermediate source 112 or 113 as faulty, a replacement component can be "hot-swapped" for it. In a hot-swap the replacement component monitors the operations of the sibling component to the component being replaced so that over a number of clock cycles the replacement component will converge and synchronize with the sibling component. Upon such convergence, the lockstep mechanism 100 and its associated method can be re-engaged under the control of control logic such as packet processor 340 or service processor 380 of FIG. 4.

With continued reference to FIG. 2, lockstep mechanism 100 optionally includes a copier 106. The copier 106 is connected to a second source (not shown) and to FIFOs 102 and 103. The copier 106 is configured to receive an original packet from the second source and to output two packets that are identical to the original packet, and which will be referred to as third and fourth packets. Third and fourth packets are outputted by the copier 106 to FIFO 102 and FIFO 103, respectively. Note that in those embodiments that include a copier 106, FIFOs 102 and 103 can each be configured as a plurality of queues with some queues dedicated to packets received from intermediate sources 112 and 113, and other queues dedicated to packets received from the copier 106. In such embodiments, the copier 106 enables the lockstep mechanism 100 and device 130 to operate bidirectionally such that packets can pass one another in opposite directions. In the absence of the copier 106, packets are constrained to travel from left to right in FIG. 2.

As further depicted in FIG. 2, third and fourth packets are transmitted from FIFOs 102 and 103 through the backplane 114 and to the intermediate sources 112 and 113, respectively. Thereafter, one of the intermediate sources 112 or 113 outputs its packet to the coupler 110. Preferably, the non-transmitting intermediate source 113 or 112 monitors the output from the transmitting intermediate source 112 or 113. Should the transmitting intermediate source 112 or 113 fail to output its packet, the non-transmitting intermediate source 113 or 112 can instead provide the output to the coupler 110.

Figure 3:
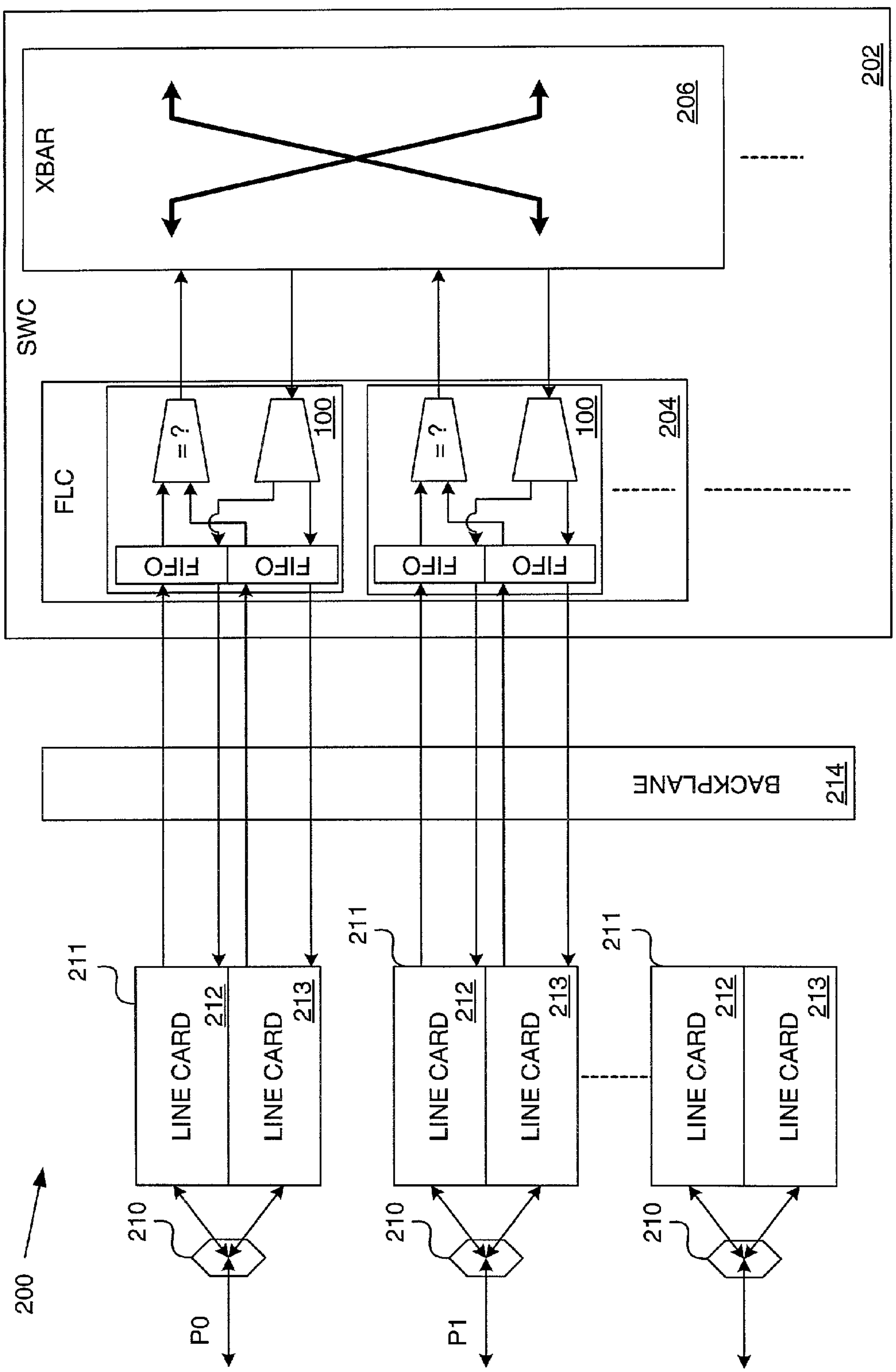
FIG. 3 is a block diagram of an exemplary packet exchange system in which an embodiment of the present invention can be implemented.

FIG. 3 is a block diagram of an exemplary packet exchange system 200 in which an embodiment of the present invention can be implemented. Again, the system 200 is for illustrative and not limiting purposes, for the present invention may be implemented in other systems with other configurations. The exemplary packet exchange system 200 comprises a switch card (SWC) 202 in communication with a plurality of line card (LC) pairs 211, connected through a backplane 214. The line card pairs 211 include two line cards, 212 and 213, of which one is considered a main line card and the other is considered a line card. Line cards 212 and 213 are analogous to the intermediate sources 112 and 113 of FIG. 2. In addition, the backplane 214 and a coupler 210 are analogous to the backplane 114 and the coupler 110, respectively. The line card pairs 211 may be in communication with a plurality of SWCs 202, as is shown in FIG. 4.

Referring again to FIG. 3, attention is directed to the SWC 202 which includes a flow control circuit (FLC) 204 in communication with a crossbar circuit switch (XBAR) 206. Each SWC 202 includes one or more FLCs 204 and one or more XBARs 206, as shown. Each FLC 204 includes one or more lockstep mechanisms 100, where each lockstep mechanism 100 is in communication with a line card pair 211 across the backplane 214, preferably through four I/O backplane ports. The FLC 204 is responsible for the flow control queuing between line cards, such as LC 212 and LC 213, and the XBAR 206.

The XBAR 206 is generally a circuit known in the art that has a plurality of vertical paths and a plurality of horizontal paths and means for interconnecting any of the vertical paths to any of the horizontal paths. In the implementation of FIG. 3, the XBAR 206 is used for switching cells, i.e., selecting an appropriate path or circuit for sending a cell to its destination.

FIG. 4 is a block diagram of an exemplary packet-switched unified network system 300 in which an embodiment of the present invention can be implemented FIG. 4 more broadly illustrates the implementation of the packet lockstep mechanism 100 described above in reference to FIG. 3. More particularly, FIG. 4 depicts a 256-port system for use in an optical transport network. Again, the unified network system 300 and associated configuration depicted is for illustrative and not limiting purposes, for the present invention may be implemented in other systems with other configurations.

The unified network system 300 includes one or more pairs of line cards 212 and 213 in communication with one or more switch cards 202 across a backplane 214, and one or more Service Processor Cards (SPC) 380 also in communication via backplane 214. Each line card 212, 213 includes one or more ports 310 for receiving and transmitting packets. Each port 310 is coupled in series first to a Gigabit Interface Converter (GBIC) 320, then to a PHY chip 330, and lastly to a Packet Processing ASIC (PP) 340. The PP 340 is further coupled to SRAM 346, to a Network Processor Unit (NPU) 342 coupled to a DRAM 344, and to the backplane 214. Each switch card 202 includes one or more Flow Control ASICs (FLC) 204 coupled to the backplane 214. Each FLC 204 is coupled to an XBAR 206 and further coupled to a GBIC 320 coupled to a cascade port 370.

The line cards 212, 213 are responsible for all packet processing, as described below, before forwarding the packet in one or many cells to a switch card 202 via backplane 214. In preferred embodiments, the unified network system 300 includes 4 or 16 line cards 212, 213. It will be appreciated that the number of line cards 212, 213 per unified network system 300 is preferably a power of two, such as 4, 8, 16, 32, and so forth, however, the present invention is not limited to such numbers and can be configured to work with any number of line cards 212, 213.

Packet processing performed by line cards 212, 213 includes Layer 1 to Layer 7 processing. Layer 1 processing is also known as physical layer processing and includes optical to electrical and vice versa conversions, and serial-differential to parallel-digital and vice versa conversions. Layers 2 and 3 include protocol conversion processing. For example, a class of conversion processes known as encapsulation relies on a common protocol layer. When the common protocol layer is the Ethernet layer the conversion is performed as Layer 2 processing, whereas if the common protocol layer is the IP layer the conversion is performed as Layer 3 processing. Another class of conversion process, known as direct translation, is an example of Layer 4 processing and is used when it is not clear that there is a common layer. Here, a common layer, for instance a Terminal Control Protocol (TCP) layer, is created.

Each line card 212, 213 supports a plurality of ports 310, for example 16 ports per line card 212. It will likewise be appreciated that the number of ports 310 per line card 212, 213 is preferably also a power of two, however, the present invention is not limited to such numbers and any number of ports 310 per line card 212, 213 can be made to work. Examples of ports 310 that are preferred for the present invention include 1X, 4X, and 12X InfiniBand™ (IB) ports, 1 Gbps and 10 Gbps Gigabit Ethernet (GE) ports, and 1 Gbps and 2 Gbps Fibre Channel (FC) ports, where IB, GE, and FC represent three different common networking protocols used to communicate between network devices. In a preferred embodiment, the 12X port will support a line rate of up to 30 Gbps.

Ports 310 are generally arranged in sets of four, along with their associated GBICs 320 and PHY chips 330, into a unit referred to as a paddle (not shown) Different paddles on the same line card 212, 213 can be configured with different kinds of ports 310 so that a single line card 212, 213 can support many different port types. It will be understood that although bi-directional ports 310 are preferred, the present invention can be implemented with single-direction ports 310.

Each GBIC 320 serves to convert an optical signal received from an optical fiber cable at the port 310 into a high-speed serial differential electrical signal. In preferred embodiments each GBIC 320 can also convert an electrical signal to an optical signal. The particular GBIC 320 component selected for a particular device should be matched to the port type and port speed. Examples of GBIC's 320 that can be used in the present invention include, among other possibilities, those capable of supporting the following protocols; 1X-IB, 4X-IB, 1GE, 10GE, FC-1G, and FC-2G.

The PHY chip 330 serves to perform a variety of physical layer conversions such as conversion from high-speed serial differential to slower parallel digital and vice versa, clock recovery, framing, and **10*b*/8*b* decoding (66*b*/64*b* decoding for 10GE ports). In a preferred embodiment, each PHY chip 330** provides one to four 8-bit data links.

Each PHY chip 330 is connected to a Packet Processing ASIC (PP) 340, as described above. In preferred embodiments, a PP 340 can handle the traffic of four ports 310. Preferably, there are four PPs 340 on each line card 212, each capable of handling up to 40 Gbps of ingress traffic, however, it will be understood that the present invention may be implemented with other numbers of PPs 340 per line card 212.

Each PP 340 is configured to handle both fast-path and slow-path packet processing. For fast-path packet processing, a newly received packet is buffered internally in an asynchronous First In First Out (FIFO) ingress buffer before its header is sent to a packet processing block, the main processor of the PP 340. The packet processing block can be IB or GE, for example, depending on the ASIC configuration setting. The packet processing block performs Layer 2 and Layer 3 processing, and additionally handles the logic for media access control, packet header parsing, destination port mapping, packet classification, and error handling as needed.

Slow-path packet processing may be used for processing at the upper layers (Layers 3–7), as may be needed, for example, for packets transmitted according to the FC protocol. The packet's header and a portion of its payload are sent to the NPU 342. Together, the PP 340 and NPU 342 form an intelligent packet forwarding engine. The NPU 342 consists of multiple CPU cores and is accompanied by DRAM 344, typically in the range of 256 MB to 8 GB. A commercially available NPU 342 is the SiByte (now part of Broadcom) 1 GHz Mercurian processor including two MIPS-64 CPU cores. Slow-path packet processing can include, for example, protocol conversion via TCP done by the NPU 342 in firmware. Other examples of intelligent packet processing utilizing the NPU 342 include server bypassing, global RAID, etc. The NPU 342 also is responsible for handling management and control packets as needed.

Each PP 340 is further coupled to an SRAM 346 chip and to the backplane 214. For dynamic packet buffering, it is desirable for SRAM 346 to have high bandwidth. An 8 MB SRAM 346 running at 250 MHz double data rate (DDR) with a 32-byte data bus is preferred. It will be understood that the present invention may be implemented with other SRAM chips 342. The connection between PP 340 and backplane 214 is preferably made through four bi-directional 10Gbps backplane links.

It will be appreciated that the lockstep mechanism 100 can be employed in a multitude of circuits, and although it has been described in detail with reference to FLC 204 to compare packets from line cards 212 and 213 and switch card 202 it will be understood that lockstep mechanism 100 can also be employed, for example, in a PP 340 for fault detection purposes. Furthermore, the lockstep mechanism 100 is not limited to operating in systems depicted herein, but may also be operable in any packet-based component or network.

Service Processor Cards (SPC) 380 are generally responsible for initial system configurations, subnet management, maintaining overall routing tables, health monitoring with alarm systems, performance monitoring, local/remote system administration access, system diagnostics, a variety of exception handlings, and for handling application software that is not otherwise run on an LC 202. Accordingly, an SPC 380 can be viewed as a special version of an LC 212 and preferably has the same general design as an LC 212.

In preferred embodiments, the unified network system 300 includes 2 or 4 switch cards 202. Switch cards 202 of the present invention preferably utilize a cell-based packet switching architecture. Accordingly, each switch card 202 includes one or more Flow Control ASICs (FLC) 204 coupled to the backplane 214. Each FLC 204 is coupled to at least one single-stage XBAR 206 and further coupled to a GBIC 320 coupled to a cascade port 370.

An FLC 204 consists mainly of on-chip SRAMs and is coupled to the backplane 214 preferably by a set of four parallel bi-directional differential links. Each FLC 204 is responsible for the flow control queuing between the backplane 214 and the at least one XBAR 206, including maintaining input/output queues, credit-based flow control for the link between a PP 340 and the FLC 204, cascade port logic, and sending requests to/receiving grants from a crossbar scheduler chip 350 connected to XBAR 206. In preferred embodiments each switch card 202 includes 16 FLCs 204 to handle communications with the PPs 340, and an additional FLC 204 dedicated to the SPCs 305, through backplane 214.

Each switch card 202 includes an XBAR 206, and in a preferred embodiment five XBARs 206 per switch card 202 are employed. The XBAR 206 is an ASIC design and in one implementation, handles cell switching among 66 input and 66 output ports, each having a bandwidth of 2 Gbps.

In preferred embodiments each FLC 204 is coupled to a GBIC 320 which is coupled to a cascade port 370. It will be appreciated, however, that in some embodiments not every FLC 204 is coupled to a GBIC 320 or a cascade port 370, as shown in FIG. 4, and in those embodiments any FLC 204 not coupled to a GBIC 320 will also not be coupled to a cascade port 370. Cascade ports 370 allow switch cards 202 of different unified network systems 300 to be coupled together. Cascade ports 370 are also used by SPCs 305 for traffic management between multiple unified network systems 300 where the CPU in one SPC 380 on a first unified network system 300 is communicating with another CPU in another SPC 380 on a second unified network system 300. Cascade ports 370 are preferably implemented using high-density, small form-factor 12X parallel fibers capable of 30 Gbps. For example, a 12X InfiniBand™ port offers 12 lines per direction, or a total of 24 lines per 12X port.

Figure 5:
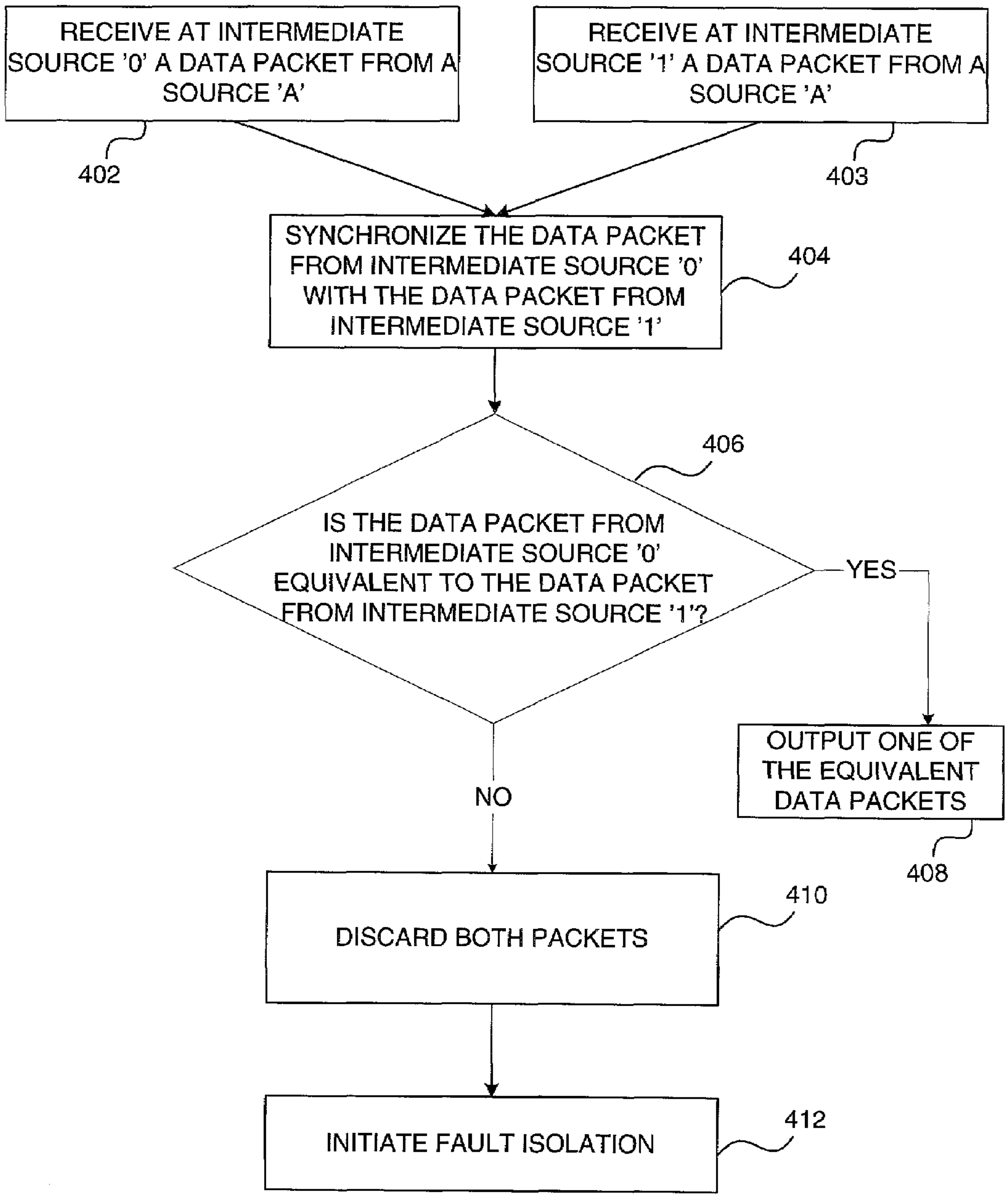
FIG. 5 is a flowchart illustrating a method for providing reliable packet data throughput in accordance with an embodiment of the present invention.

FIG. 5 is a flowchart illustrating steps for providing reliable packet data throughput utilizing packet lockstepping, in accordance with an embodiment of the present invention. At steps 402 and 403 a source packet from a source is received at a first intermediate source 112 and at a second intermediate source 113, respectively. At step 404 the packets that are transmitted from the intermediate sources 112 and 113 to FIFOs 102 and 103, respectively, where they are synchronized. At step 406 a comparator 104 determines, by comparing means, whether the packet from the first intermediate source 112 is equivalent to the packet from the second intermediate source 113.

If the packets from the intermediate sources 112 and 113 are equivalent, then the packet is output at step 408. In the preferred embodiment of the present invention, if the packets from the intermediate sources 112 and 113 are not equivalent, then at step 410 both packets are discarded and at step 412 a fault isolation routine is initiated. Step 412 can include, amongst other actions, interrupting the lockstep comparison of packets and can also include hot-swapping a good component for the failed one, as will be appreciated by those skilled in the art.

It will be appreciated that in the event of a discrepancy between the two packets, in alternative embodiments at step 410 only one packet is discarded and the packet deemed most reliable is output from mechanism 100. Heuristics can be used to evaluate the intermediate sources 112 and 113 to determine if one is faulty, and based upon such a determination the packet processed by the intermediate source 112 or 113 that appears to be functioning properly will be deemed to be most reliable.

In the foregoing specification, the invention is described with reference to specific embodiments thereof. It will be recognized by those skilled in the art that while the invention is described above in terms of preferred embodiments, it is not limited thereto. Various features and aspects of the above-described invention may be used individually or jointly. Further, although the invention has been described in the context of its implementation in a particular environment and for particular applications, those skilled in the art will recognize that its usefulness is not limited thereto and that it can be utilized in any number of environments and applications without departing from the broader spirit and scope thereof. The specification and drawings are, accordingly, to be regarded in an illustrative rather than a restrictive sense.

What is claimed is:

1. A data packet lockstep mechanism for a first data packet received and processed in a first source and a second data packet received and processed in a second source, the second data packet being equivalent to the first data packet, the mechanism comprising;

- a first buffer configured to receive the first data packet from the first source;
- a second buffer configured to receive the second data packet from the second source;
- a comparator configured to receive the first and second data packets and to output one of the data packets upon a determination of equivalence between the data packets; and
- a copier configured to receive a third data packet and to output the third data packet to one of the first and second buffers and to output a copy of the third data packet to the other of the first and second buffers.

2. The mechanism of claim 1 wherein each buffer is a first-in first-out memory.

3. The mechanism of claim 1 wherein the first and second sources are line cards.

4. The mechanism of claim 1 wherein the comparator compares a first signature derived from the first data packet with a second signature derived from the second data packet to make the determination of equivalence.

5. The mechanism of claim 4 wherein the first and second signatures are checksums.

6. A packet-switching unified network system comprising:

- a first main line card including a port capable of receiving a first packet;
- a first spare line card including a port capable of receiving a second packet; and
- a switch card in communication with the main and spare line cards across a backplane, the switch card including:
  - a flow control circuit having first and second buffers configured to receive the first and second data packets;
  - a comparator configured to make a determination of equivalence between the first and second data packets and to output one of the data packets upon the determination of equivalence; and
- a crossbar circuit in communication with the comparator;
  - the flow control circuit further having:
    - a copier in communication with the crossbar circuit and configured to receive the data packet output the comparator and to output as a third data packet the data packet output from the comparator and a fourth data packet that is a copy of the data packet out put from the comparator;
    - a third buffer configured to receive the third data packet from the copier; and
    - a fourth buffer configured to receive the fourth data packet form the copier.

7. The packet-switching unified network system of claim 6 further comprising: a second main line card in communication with the third buffer and including at least one port capable of transmitting the third packet; and a second spare line card in communication with the fourth buffer and including at least one port capable of transmitting the fourth packet.

8. A method for lockstep data packet processing comprising:

- processing a first data packet in a first source;
- processing a second data packet in a second source, the second data packet being equivalent to the first data packet;
- outputting a processed second data packet from the second source;

receiving the first processed data packet in a first buffer;

determining whether the first and second processed data packets are equivalent; and passing one of the first and second processed data packets if the first and second processed data packets are determined to be equivalent; and receiving a third data packet;

outputting the third data packet to one of the first and second buffers; and outputting a copy of the third data packet to the other of the first and second buffers.

9. The method of claim 8 further comprising synchronizing the first and second processed data packets before comparing the first and second processed data packets.

10. The method of claim 8 wherein determining whether the first and second processed packets are equivalent is performed by comparing a first signature derived from the first processed data packet and a second signature derived from the second processed data packet.

11. The method of claim 10 wherein the first and second signatures are checksums.

12. The method of claim 8 where, if the first and second processed data packets are determined to be not equivalent, the first and second processed data packets are discarded.

13. The method of claim 12 further including initiating a fault isolation mode.

14. The method of claim 8 further including deriving the first and second data packets from an original data packet.

15. The method of claim 13 wherein the fault isolation mode includes error logging.

16. The method of claim 13 wherein the fault isolation mode includes a system alarm.

* * * * *